United States Patent [19]

Minami

[11] 3,908,135

[45] Sept. 23, 1975

[54] DEVICE FOR VARYING OUTPUT VOLTAGE

[75] Inventor: Shunji Minami, Moriguchi, Japan

[73] Assignee: Matsushita Electric Industrial Co., Ltd., Japan

[22] Filed: Sept. 11, 1974

[21] Appl. No.: 505,007

[30] Foreign Application Priority Data

Sept. 20, 1973 Japan .................................. 48-110427
Sept. 20, 1973 Japan .................................. 48-106609

[52] U.S. Cl. ............ 307/237; 307/247 A; 307/304; 330/30 D; 307/264

[51] Int. Cl.² ............................................ H03K 5/08

[58] Field of Search ....... 307/237, 304, 247 A, 264; 330/30 D

[56] References Cited

UNITED STATES PATENTS

| | | | |
|---|---|---|---|
| 3,350,573 | 10/1967 | Barany | 307/237 |
| 3,571,620 | 3/1971 | Hansen | 307/304 X |
| 3,588,525 | 6/1971 | Hatsukano | 307/304 X |
| 3,646,364 | 2/1972 | Kaminski | 307/304 X |

*Primary Examiner*—John S. Heyman
*Attorney, Agent, or Firm*—Burgess, Ryan and Wayne

[57] ABSTRACT

In a device for varying the output voltage of a MOS FET of the type wherein the gate thereof is connected through a neon bulb to an input terminal and is grounded through a capacitor, an output voltage limiter circuit is placed in order to limit the range of variation in output voltage. The limiter circuit comprises two series-connected circuits connected in parallel, one series-connected circuit consisting of a first diode whose anode is connected to the collector of a PNP transistor and the other, a second diode whose cathode is connected to the collector of an NPN transistor. The cathode and anode of the first and second diodes are connected to the terminal on the side of the input terminal of the neon bulb, and the bases of both PNP and NPN transistors are connected to an output terminal, that is the source of the MOS FET. The emitter voltage applied to the NPN transistor is so selected that when the output voltage exceeds the emitter voltage, the NPN transistor is turned on so that the neon bulb is turned off. Thus the output voltage may be maintained at a predetermined maximum level even when the positive input voltage increases. On the other hand, the emitter voltage applied to the PNP transistor is so selected that when the output voltage drops below the emitter voltage as the negative input voltage increases, the PNP transistor is turned on so that the neon bulb is also turned off. Thus the output voltage may be maintained at a predetermined minimum level. Between the maximum and minimum levels, the output voltage may be gradually and steplessly varied, for instance, over the operating range of a differential amplifier connected to the output terminal. Moreover, two neon bulbs may be inserted in the limiter circuit so that one of them may be turned on when the maximum voltage is reached while the other is turned on when the minimum output voltage is reached.

5 Claims, 4 Drawing Figures

DEVICE FOR VARYING OUTPUT VOLTAGE

BACKGROUND OF THE INVENTION

The present invention relates to a device for varying the output voltage of a MOS field-effect transistor of the type wherein the voltage across a nonpolarized electrolytic capacitor placed between the gate of the MOS FET and the ground increases or decreases as a switch selectively interconnects between the input terminal and a positive or negative power source so that the output voltage of the MOS FET may be increased or decreased accordingly. More particularly, the present invention relates to an device for varying the output voltage of a MOS field-effect transistor of the type described and further provided with a limiter circuit for determining the range over which the output voltage may vary.

In general, slider type variable resistors are used as a volume control for television receivers or the like, but they have distinct disadvantages that the noise is produced by the sliding contact between a slider and a resistor element and that their service life is short because of the wear of the resistor element.

In order to control the volume by the conventional remote control systems, a stepping relay is driven so as to establish a suitable combination of a plurality of resistors. However, this system has also the distinct defects that the operation is not reliable and the service life is also short because of the mechanical contacts of the stepping relay.

In order to overcome the above defects, there has been proposed a device in which two series-connected circuits each consisting of a silicon-controlled rectifier (to be referred to as a "SCR" hereinafter) and a diode are placed in parallel in a limiter circuit in such a way that the currents flow in the opposite directions. However, this device has also a defect that the erractic operation of SCRs tends to occur often due to the noise.

SUMMARY OF THE INVENTION

One of the objects of the present invention is therefore to provide a device for varying the output voltage which may eliminate the use of a sliding type variable resistor or stepping relay, may gradually vary the output voltage as with the case of a slider type variable resistor and is reliable in operation without producing noise and long in service life.

Another object of the present invention is to provide a device for varying the output voltage which incorporates a limiter circuit for limiting the range over which the output voltage may vary in order to ensure the quick variation in output voltage.

A further object of the present invention is to provide a device for varying the output voltage which incorporates a differential amplifier so that the output voltage may be varied within the operating range of the differential amplifier.

A further object of the present invention is to provide a device for varying the output voltage which may visually indicate when the output voltage reaches the maximum or minimum voltage and whose operation is reliable and dependable.

According to the present invention, a neon bulb is placed between the gate of a MOS field-effect transistor and a switch which is adapted to selectively close a positive fixed terminal connected to a positive power source, a negative fixed terminal connected to a negative power source or a neutral terminal, and nonpolarized electrolytic capacitor is placed between the gate of the MOS field-effect transistor and the ground so that as the switch selects the positive or negative power source the capacitor charges or discharges with the resulting increase or decrease in output voltage of the MOS field-effect transistor. According to the present invention, the device for varying the output voltage of a MOS field-effect transistor of the type described further incorporates a limiter circuit of the type wherein two series-connected circuits each consisting of a diode connected to one output terminal of a transistor are connected in parallel to the terminal of the neon bulb on the side of the positive or negative power source with the diodes in back-to-back relation and the output terminal of the MOS field-effect transistor is connected to the input terminals of the transistors. Thus the output of the MOS field-effect transistor may vary over the range between the voltages applied to the other output terminals of the transistors.

According to one embodiment of the present invention, the device further comprises a differential amplifier so that the output voltage of the MOS field-effect transistor may be varied within the operating range of the differential amplifier.

According to a further embodiment of the present invention, a neon bulb is placed between the transistor and the diode in each series-connected circuit of the limiter circuit so that one of the neon bulbs may be turned on when the maximum output voltage is reached while the other neon bulb may be turned on when the minimum output voltage is reached and that the reliable and dependable operation of the device may be ensured.

The above and other objects, features and advantages of the present invention will become more apparent from the following description of the preferred embodiments thereof taken in conjunction with the accompanying drawing.

BRIEF DESCRIPTION OF THE DRAWING

Throughout the figures similar parts are designated by same reference numerals.

DESCRIPTION OF THE PREFERRED EMBODIMENTS

Figure 1:
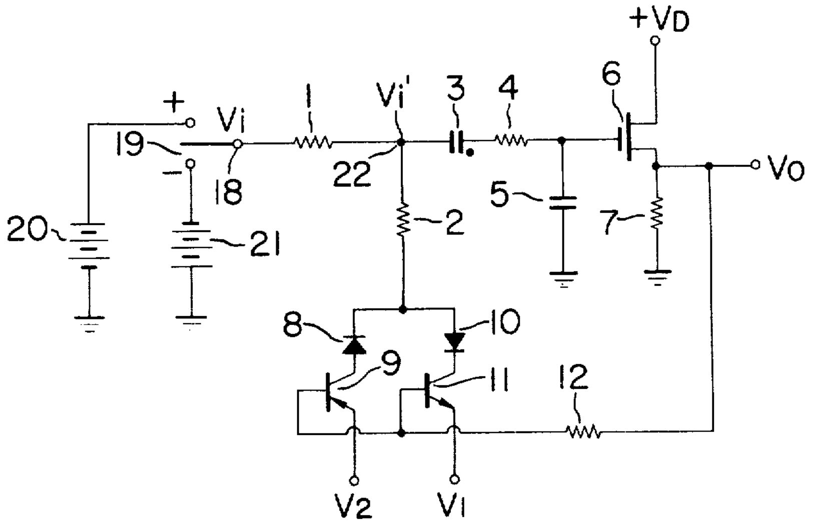
FIGS. 1 and 2 are circuits diagrams of a first and second embodiments of the present invention, respectively.

First Embodiment, Fig. 1

Referring to FIG. 1 illustrating the first embodiment of the present invention, either a positive or a negative power source 20 or 21 is connected to an input terminal 18 through a single-pole, double-throw, center-off switch 19, and the input voltage $V_i$ is divided by a voltage divider consisting of resistors 1 and 2. The junction between the resistors 1 and 2 is connected through a neon bulb 3 and an input resistor 4 to the gate of a MOS field-effect-transistor 6 (to be referred to as "FET" hereinafter in this specification). A nonpolarized capacitor 5 is connected between the gate of the FET 6 and the ground, and an output resistor is connected between the source of FET 6 and the ground, the voltage across the output resistor 7 being the output voltage $V_0$. The drain voltage $+V_D$ is applied to the drain of FET 6.

Diodes 8 and 10 have their cathode and anode, respectively, connected to the end of the resistor 2 remote from its junction with the resistor 1, and have their anode and cathode, respectively, connected to the collectors of a PNP transistor 9 and an NPN transistor 11, respectively. The bases of the transistors 9 and 11 are connected through a control resistor 12 to the source of FET 6. In the instant embodiment, the emitter voltages of the transistors 9 and 11 are so selected as to satisfy the following relation:

$$V_1 > V_2$$

where $V_1$ and $V_2$ are emitter voltages applied to the transistors 11 and 9, respectively.

Figure 2:
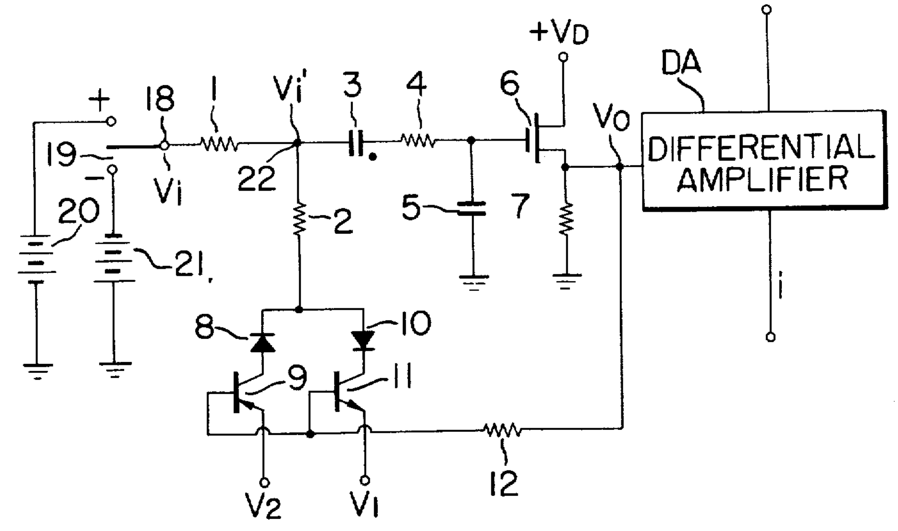

Second Embodiment, Fig. 2

The second embodiment shown in FIG. 2 is adapted to be used as a volume control circuit, and is substantially similar in construction to the first embodiment described above except that the output terminal of the first embodiment is connected to the control terminal of a differential amplifier DA so that the audio signal current *i* flowing through the differential amplifier DA may be varied in response to the output voltage $V_0$ as will be described in detail hereinafter.

Figure 3:
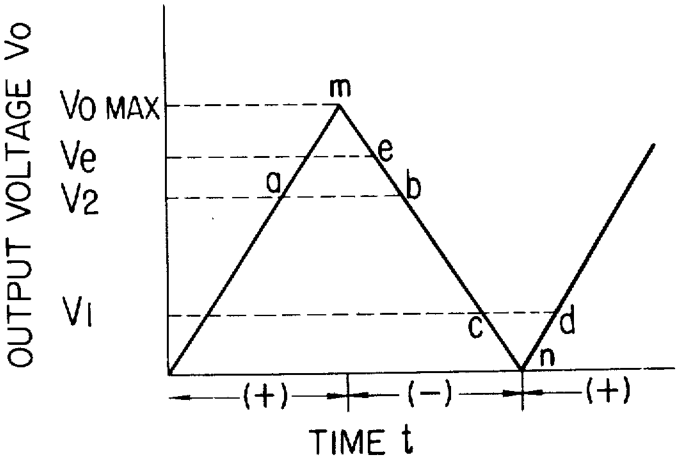
FIG. 3 is a graph illustrating the relation between the input voltage impression time (t) and the output voltage ($V_o$)

Mode of Operation, Figs. 1, 2, and 3

When the output voltage $V_0$ satisfies the following relation $$V_1 > V_0 \geqq V_2$$

no base currents flow into and out of the transistors 9 and 11 so that they remain turned off. When the positive input voltage $V_i$ is higher than the firing potential of the neon bulb 3, the voltage $V_i$ at the junction between the resistors 1 and 2 is given by $$V_i = \frac{R_2 + R_T}{R_1 + R_2 + R_T} \times V_i \approx V_i$$

where

- $R_1$ and $R_2$ = resistance of resistors 1 and 2, respectively; and
- $R_T$ = resistance of transistors 9 and 11 when both are turned off, $R_T >> R_1$ and $R_2$.

As a result, the neon bulb 3 is turned on, and the current flows through the input resistor 4 and charges the capacitor 5, so that the gate voltage $V_0$ increases. When the input voltage $V_i$ drops to zero the neon bulb 3 is turned off, and the voltage across the capacitor 5 is maintained constant. Accordingly, the output voltage $V_0$ may be maintained constant.

When the positive input voltage is applied, the output voltage $V_0$ becomes higher than the emitter voltage $V_i$ so that the transistor 11 is turned on. In this case, the voltage $V_i$ at the junction between the resistors 1 and 2 is given by $$V_i' = \frac{R_2 + R_T'}{R_1 + R_2 + R_T'} \times V_i = \frac{R_2}{R_1 + R_2} \times V_i$$

where

- $R'_T$ = resistance when transistors 9 and 11 are turned on, $R'_T << R_1$ and $R_2$.

In the instant embodiments, the resistances of the resistors 1 and 2 are so selected that the voltage $V_i'$ is less than the firing potential of the neon bulb 3. Then, even when the input voltage is increased, the voltage $V_i'$ is always less than the firing potential of the neon bulb 3 so that the voltage across the capacitor 5 will not exceed a predetermined level. This means that the output voltage $V_0$ will not exceed a predetermined level.

On the other hand when the negative input voltage $V_i$ is applied to the input terminal 18, the neon bulb 3 is turned on or conducts under the following condition:

$$V_1 \geqq V_0 > V_2$$

so that the capacitor 5 discharges with the resulting decrease in output voltage $V_0$. When the switch 19 is turned off, the output voltage $V_0$ remains at a constant level. When the negative input voltage $V_i$ is increased, the output voltage $V_0$ becomes less than the emitter voltage $V_2$. Consequently, the transistor 9 is turned on so that the neon bulb 3 is turned off. Thus, the overdischarge of the capacitor 5 may be prevented. This means that the output voltage $V_0$ will not decrease below a predetermind level. Thus, the output voltage $V_0$ may be varied over a limited range by varying the emitter voltages $V_1$ and $V_2$ under the condition $V_1 > V_2$.

FIG. 3 is a graph illustrating the relation between the input voltage applying time (t) and the output voltage ($V_0$) of the second embodiment shown in FIG. 2. It is seen that when the positive input voltage is applied to the input terminal 18, the output voltage $V_0$ increases as the input voltage applying time elapses. On the other hand, when the negative input voltage is applied, the output voltage $V_0$ decreases as the input voltage impression time (*t*) elapses. The differential amplifier DA is controlled in response to the output voltage $V_0$ to control the audio signal *i.* When the operating range of the differential amplidier DA is between $V_1$ and $V_2$, the volume remains unchanged even when the output voltage $V_0$ changes along the line *a-m-b* in FIG. 3 and the line *c-n-d*. Therefore, if a limiter circuit consisting of the transistors 9 and 11, the diodes 8 and 10, and the resistors 2 and 12 (See FIG. 2) were not inserted, the volume will not change at all as the output voltage $V_0$ drops from the point *e* to the point *b* even when the negative input voltage $V_i$ is applied when the output voltage is $V_e$. The volume is decreased only when the output voltage $V_0$ drops to the point *b*. That is, even when the input voltage is applied, the volume will not change until a certain time has passed. However, according to the present invention, the limiter circuit is inserted in such a way that the maximum output voltage equals the emitter voltage $V_1$ while the minimum output voltage equals the emitter voltage $V_2$. That is, the output voltage $V_0$ will not exceed the emitter voltage $V_2$ and will not decrease below the emitter voltage $V_1$. Therefore, the volume may be changed immediately when the input voltage is applied to the input terminal regardless of the level of the output voltage $V_0$. Another important feature of the present invention is that the transistors, whose operation is more reliable and stable than that of the silicon controlled rectifiers, are used so that the erratic operation of the limitter circuit may be minimized.

Figure 4:
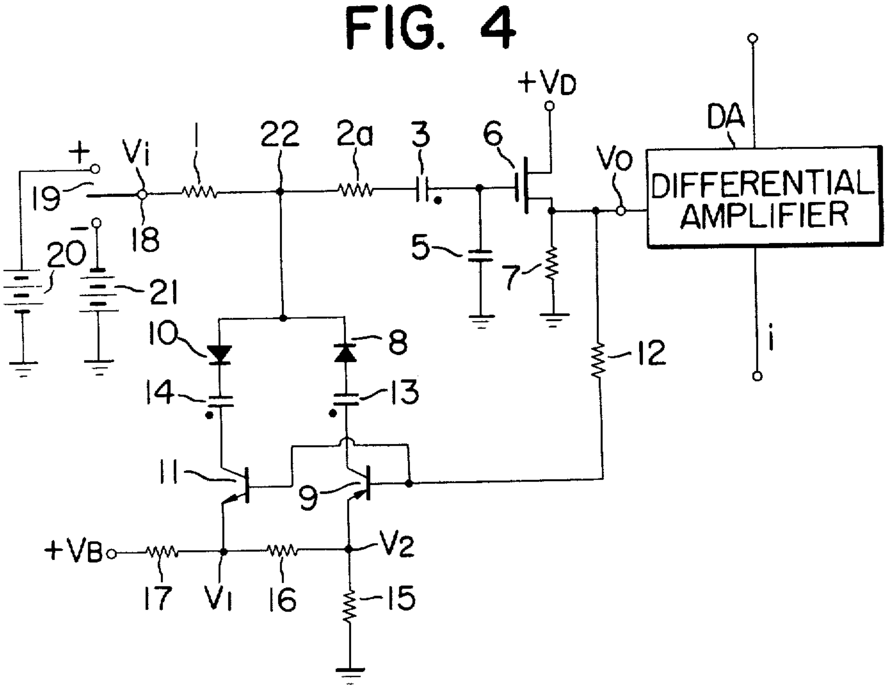
FIG. 4 is a circuit diagram of a third embodiment of the present invention.

Third Embodiment, Fig. 4

Referring to FIG. 4 illustrating the circuit diagram of the third embodiment of the present invention, the resistance of the resistor 1, whose one end is connected to the input terminal 18, is determined depending upon the firing potential of neon bulbs 13 and 14. The other end of the resistor 1 is connected through an input resistor 2*a*, and the neon bulb 3 to the gate of FET 6. The collectors of teh transistors 9 and 11 are connected to the junction 22 between the resistor 1 and the input resistor 2*a* through the neon bulbs 13 and 14 and the diodes 8 and 10, respectively, which serve to prevent the erratic operation due to the reverse current. The emitters of the transistors 9 and 11 are connected to the source $+V_B$ through a voltage divider consisting of resistors 15, 16, and 17 so that the emitter voltages $V_2$ and $V_1$ may be applied to the emitters of the transistors 9 and 11, respectively. The nonpolarized capacitor 5 placed between the gate of FET 6 and the ground, charges and discharges through the input resistor 2*a* as the neon bulb 3 conducts. The output resistor 7 is placed between the source of FET 6 and the ground, and the drain voltage $V_D$ is applied to the drain of FET 6. The output voltage $V_0$ is derived from the source of FET 6. The source of FET 6 is connected to the bases of both transistors 9 and 11 through the resistor 12 whose resistance $R_{12}$ is selected to satisfy the following relation in order to prevent the variation in output voltage $V_0$ :

$$R_{12} >> R_7$$

where $R_7$ = resistance of resistor 7.

Next the mode of operation of the third embodiment with the above construction will be described hereinafter. When the positive input voltage $V_i$ is in excess of a firing potential of the neon bulb 3, the latter conducts so that the capacitor 5 is charged with a time constant $R_{2a} \times C$, where $R_{2a}$ is the resistance of the input resistor 2*a* and C, the capacitance of the capacitor 5. As a result the gate voltage of FET 6 increases, resulting in increase in the drain current and the output voltage $V_0$. When the application of the positive input voltage to the input terminal 18 is interrupted, the neon bulb 3 is turned off, but the voltage across the capacitor 5 remains unchanged, so that the output voltage $V_0$ may be maintained constant. When the positive input voltage is applied to the input terminal 18 again, the output voltage $V_0$ increases. When the output voltage $V_0$ exceeds the emitter voltage $V_1$, that is when the transistor 11 is turned on, the neon bulb 14 conducts. Since the extinction potential of the neon bulb 3 is higher than the firing voltage Es of the neon bulbs 13 and 14, the input voltage $V_i$ drops to Es. That is, the input voltage $V_i$ drops below the extinction potential of the neon bulb 3, so that the latter is turned off. Thus, even when the input voltage $V_i$ is kept applied, the output voltage $V_0$ will not increase any longer.

On the other hand, when the negative input voltage is applied to the input terminal 10, the neon bulb 3 conducts again so that the capacitor 5 is discharged with the resultant decrease in output voltage $V_0$. When the output voltage $V_0$ drops below the emitter voltage $V_2$, the transistor 9 is turned on so that the neon bulb 13 conducts. Thus the voltage at the junction 22 drops to the firing voltage of the neon bulb 13, so that the neon bulb 3 is turned off. As a result even when the negative input voltage is kept applied, the output voltage $V_0$ will not drop any longer.

When the neon bulbs 12 and 13 are connected as shown in FIG. 4, the neon bulb 14 is turned on when the maximum output voltage is reached while the neon bulb 13 is turned on when the minimum output voltage is reached. Therefore, the volume of an audio system connected to the device shown in FIG. 4 will not change beyond and below the output voltage of the latter. Furthermore the insertion of the neon bulbs 13 and 14 serves to prevent the erratic function of the limiter circuit.

What is claimed is:

1. A device for varying output voltage within a limited range comprising a. a single-pole, double-throw, center-off switch, b. a first resistor, a neon bulb having one terminal connected to an armature of said switch through said first resistor, c. an input resistor, a MOS field-effect transistor having a gate connected through said input resistor to the other terminal of said neon bulb, d. a non-polarized capacitor electrically connected between the gate of said MOS field-effect transistor and the ground, e. an output resistor electrically connected between the source of said MOS field-effect transistor and the ground, f. a first diode cathode is connected to the junction of said neon bulb and said input resistor through a first control resistor to interrupt the input signal to be transmitted to said first diode, g. a PNP type transistor whose collector is connected to the anode of said first diode, h. a second diode whose anode is connected to the cathode of said first diode, i. a NPN type transistor whose collector is connected to the cathode of said second diode, and j. the bases of said PNP type and NPN type transistors are connected through a second control resistor to the source of said MOS field-effect transistor, whereby the output voltage of said MOS field-effect transistor is derived from the source of said MOS field-effect transistor while the control voltages for limiting the output voltage are applied to the emitters of the PNP type transistor and the NPN type transistor respectively.

2. A device for varying output voltage within a limited range as defined claim 1 wherein a differential amplifier is further provided, to the control terminal of which the output voltage of said MOS field-effect transistor is applied.

3. A device for varying output voltage within a limited range as defined claim 1 wherein said control voltages for limiting the output voltage respectively are equal to the upper and lower limit voltages of the operable input range of said differential amplifier and are applied to the emitters of said PNP type transistor and NPN type transistor respectively.

4. A device for varying output voltage within a limited range as defined claim 1 wherein neon bulbs are electrically connected between said diodes and said NPN type and PNP type transistors respectively.

5. A device for varying output voltage within a limited range as defined claim 4 wherein said control voltages for limiting the output voltage respectively are equal to the upper and lower limit voltage of the operable input range of said differential amplifer and are applied to the emitters of said PNP type transistor and said NPN type transistor respectively.

* * * * *